United States Patent Office 2,829,179
Patented Apr. 1, 1958

2,829,179

β,2,5-TRICHLOROSTYRENE AND METHOD FOR MAKING

Robert R. Dreisbach, John F. Mulloy, and Fred J. Lowes, Midland, Mich., assignors to The Dow Chemical Company, Midland, Mich., a corporation of Delaware No Drawing. Application September 9, 1955
Serial No. 533,498

1 Claim. (Cl. 260—651)

This invention pertains to a new compound, β,2,5-trichlorostyrene, made a method for making the same.

In the course of an investigation into the chlorination of 2,5-dichlorostyrene by addition of chlorine to a liquid solution of 2,5-dichlorostyrene and 2,5-dichloroethylbenzene, it was discovered that a part of the reacted 2,5-dichlorostyrene was converted to β,2,5-trichlorostyrene having the structural formula:

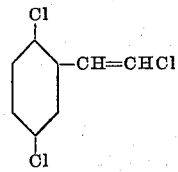

The β,2,5-trichlorostyrene was obtained as a colorless liquid, probably a mixture of cis- and trans-geometric isomers, having the following properties:

Refractive index, $n_D^{25}$_____ 1.59
Density, grams per ml. at 25° C_____ 1.38
Boiling range, at 5 mm. Hg, abs. press., °C___ 108–112

β,2,5-trichlorostyrene does not readily homopolymerize, but mixtures thereof with polymerizable styrene compounds, such as mixtures of styrene and β,2,5-trichlorostyrene, and mixtures of 2,5-dichlorostyrene and β,2,5-trichlorostyrene, readily copolymerize by heating, or in contact with polymerization catalysts. β,2,5-trichlorostyrene also has a property of affecting the growth of plants, and can advantageously be applied by known procedures, either as a spray or in the form of a dust, alone or in admixture with inert liquid or solid diluents, to the foliage of growing plants to control the growth thereof, or to kill such plants, and can be admixed with agricultural soil to prevent the germination of seeds and the growth of seedlings in such soil. By judicious application a selective effect can be obtained. By way of specific example, a tilled garden soil was seeded in the normal manner with millet (a grass type plant) and with radish (a broadleaf plant). β,2,5-trichlorostyrene was then applied to the surface of the soil at a rate of 50 pounds per acre. The germination and growth of the millet were substantially prevented while the germination and growth of the radishes were substantially unaffected in the treated soil.

β,2,5-trichlorostyrene can be made by addition of chlorine to liquid 2,5-dichlorostyrene in the absence of catalysts known to promote chlorination of the nucleus of aromatic compounds. The reaction can be carried out with or without exposure of the reaction mixture to light, since light is neither necessary nor harmful to the course of the reaction. The reaction can be carried out over a wide range of temperatures, e. g. from −70° C., or below, up to temperatures at which the rate and extent of polymerization of 2,5-dichlorostyrene become excessive or disadvantageous, preferably between 0° and about +70°

C. The chlorination reaction rate increases with an increase in reaction temperature.

As starting material, there can be used liquid 2,5-dichlorostyrene per se, or a liquid solution thereof in a suitable chlorination medium such as a less-readily-chlorinated liquid diluent. A convenient starting material is the mixture of 2,5-dichlorostyrene and 2,5-dichloroethylbenzene that is obtained as reaction product from the partial dehydrogenation of 2,5-dichloroethylbenzene, the unreacted 2,5-dichloroethylbenzene in the mixture serving as an inert liquid medium for the chlorination of the 2,5-dichlorostyrene.

By the procedure just described, about one-third of the 2,5-dichlorostyrene is converted to β,2,5-trichlorostyrene, the balance being converted principally to 1,4-dichloro-2-(1,2-dichloroethyl)benzene. The latter compound is also useful as a selective herbicide and plant growth control agent, and is fully described in a copending application, Serial Number 533,497, filed concurrently herewith. The β,2,5-trichlorostyrene can readily be separated from the 1,4-dichloro-2-(1,2-dichloroethyl)benzene and from unreacted 2,5-dichlorostyrene and 2,5-dichloroethylbenzene, e. g., by fractional distillation under reduced pressure.

In the copending application just referred to, there is disclosed a method for making 1,4-dichloro-2-(1,2-dichloroethyl)benzene which comprises contacting 2,5-dichlorostyrene in a liquid form with chlorine in the presence of absorbent carbon, whereby the addition of chlorine to the vinyl group and the formation of the styrene dichloride compound take place substantially without formation of β,2,5-trichlorostyrene. It is further disclosed that absorbent carbon, such as vegetable charcoal, exercises an unexpected selective catalytic activity in this respect, since other absorbent solids, such as silica gel, do not prevent the formation of β,2,5-trichlorostyrene.

In view of these facts, the present method for the preparation of β,2,5-trichlorostyrene by interaction of liquid 2,5-dichlorostyrene and molecular chlorine must be carried out in the substantial absence of absorbent carbon. In order to avoid further chlorination of the benzene ring of the 2,5-dichlorostyrene, β,2,5-trichlorostyrene, 2,5-dichloroethylbenzene, and related compounds that may be present in a reaction mixture employed in the present process, it is also desirable to exclude from that reaction mixture materials that are capable of catalyzing nuclear chlorination of aromatic compounds.

A suitable method for preparation of β,2,5-trichlorostyrene is illustrated by the following example, which should not be construed as limiting the scope of the invention.

*Example*

Into an all-glass reactor equipped with a stirrer, a reflux condenser, a thermometer, a gas sparging tube, and an external cooling-water bath, was charged a mixture of 2,5-dichlorostyrene and 2,5-dichloroethylbenzene. This mixture was the reaction product obtained by partial dehydrogenation of 2,5-dichloroethylbenzene, and contained approximately 23 percent by weight of 2,5-dichlorostyrene.

The contents of the reactor were cooled to a temperature between 15° and 20° C., and flow of chlorine gas through the sparging tube and below the liquid level of the reaction mixture was started. The temperature of the reaction mixture rose rapidly to about 40° C. and remained at about 40° C. during the chlorination reaction, while external cooling of the reactor was continued. When the reaction was complete, the reaction mixture temperature fell to about 10° C., and unreacted chlorine vented through the condenser. Flow of chlorine gas was then stopped, and the liquid reaction mixture was blown with air until substantially free of unreacted chlorine. The organic liquid was washed with a dilute aqueous sodium carbonate solution, separated, dried, and filtered. A portion of the neutral chlorinated liquid was analyzed by mass spectroscopy and found to contain about 8 percent by weight of β,2,5-trichlorostyrene, about 18 percent 1,4-dichloro-2-(1,2-dichloroethyl)benzene, about 2 percent unreacted 2,5-dichlorostyrene, and the 2,5-dichloroethylbenzene. The neutral chlorinated material was fractionally distilled, and the β,2,5-trichlorostyrene was collected in a fraction boiling at 76° C. at about 0.3 mm. of mercury, absolute pressure. The yield of β,2,5-trichlorostyrene was about 31 percent of theory based on the 2,5-dichlorostyrene charged.

The β,2,5-trichlorostyrene product so obtained was a colorless liquid, probably a mixture of cis- and trans-geometric isomers, and had these properties:

Refractive index, $n_D^{25}$------------------ 1.59
Density, grams per ml. at 25° C------------- 1.38
Boiling range, at 5 mm. Hg, abs. press., ° C---- 108–112

The highest melting point obtained by recrystallization was 22.8° C. The elemental analyses were as follows, the values found being average values in percent by weight, and the theoretical values being calculated for β,2,5-trichlorostyrene:

|  | Theory, percent | Found, percent |
| --- | --- | --- |
| Chlorine, Total | 51.3 | 50.5 |
| Chlorine, Side Chain | 17.1 | 17.1 |

We claim:

β,2,5-trichlorostyrene, a colorless liquid boiling at between 108° and 112° C. at 5 mm. of mercury, absolute pressure, and having the structural formula

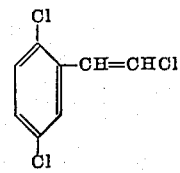

References Cited in the file of this patent

Emerson et al.: "Jour. Am. Chem. Soc.," vol. 67, pages 518–20 (1945).

Huntress: "Organic Chlorine Compounds," page 894 (1948).